United States Patent [19]

Rozentals

[11] Patent Number: 4,765,762
[45] Date of Patent: Aug. 23, 1988

[54] HARDENED BALL BEARING ASSEMBLY

[75] Inventor: Alfreds Rozentals, Northboro, Mass.

[73] Assignee: Lundquist Tool & Mfg. Co., Inc., Worcester, Mass.

[21] Appl. No.: 15,990

[22] Filed: Feb. 18, 1987

[51] Int. Cl.$^4$ ............................................. F16C 19/04
[52] U.S. Cl. ..................................... 384/539; 384/510
[58] Field of Search .............. 384/539, 625, 615, 617, 384/510

[56] References Cited

U.S. PATENT DOCUMENTS

| | | | |
|---|---|---|---|
| 3,454,314 | 7/1969 | Sanguinetti | 384/539 |
| 3,682,519 | 8/1972 | Shepelyakovsky et al. | 384/625 |
| 4,097,959 | 7/1978 | Johnson | 16/136 |
| 4,359,804 | 11/1982 | McNinch | 16/276 |
| 4,364,615 | 12/1982 | Euler | 384/539 |

Primary Examiner—Lenard A. Footland
Attorney, Agent, or Firm—Lahive & Cockfield

[57] ABSTRACT

A hardened bearing assembly has an inner and an outer race and a plurality of rolling bearing elements between the inner and outer races. The inner and the outer races each have a respective opposing retaining face dimensioned for an interference fit one about the other so that the bearing assembly may be assembled into an integral bearing assembly by providing an assembly force to one of the races for driving the opposing retaining faces past an interference fit position to a position in which each race rotates freely with respect to the other. The retaining face of one race includes a radially protruding ridge, and the corresponding retaining face of the other race includes a plurality or radially protruding ears, the ridge and the ears each extending to peaks which are pushed past each other for providing the interference fit. The interference fit dimension is larger than the dimensional tolerance for a relatively low-precision manufacturing process, such as metal stamping. Snap-together bearings having a Rockwell C hardness of sixty or more are thus manufactured without precision machining or grinding. Roller structures, such as wheels, and hinge structures using such bearings are shown, and a method of manufacturing small hardened bearing assemblies is described.

10 Claims, 5 Drawing Sheets

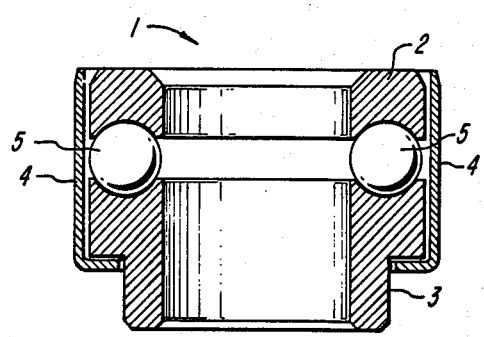
FIG. 1A
(PRIOR ART)
FIG. 1B
(PRIOR ART)
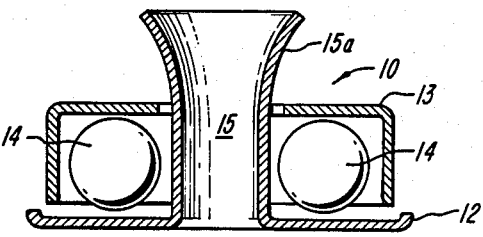
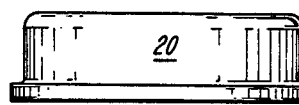
FIG. 2A
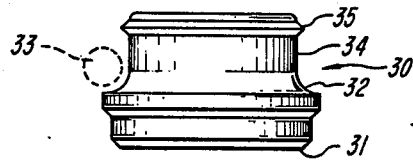
FIG. 2B
FIG. 4A
FIG. 4B
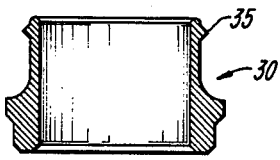

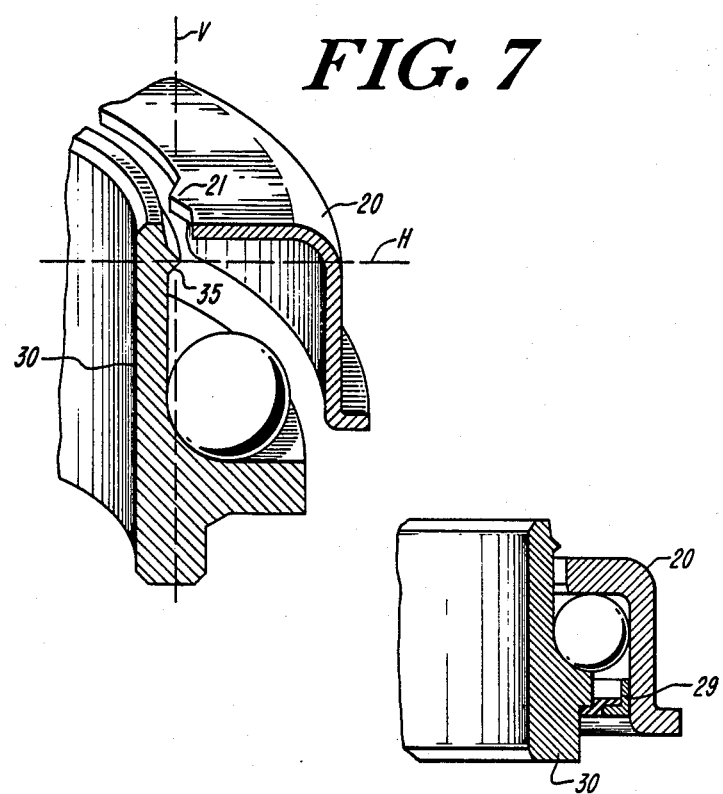
FIG. 7
FIG. 8A
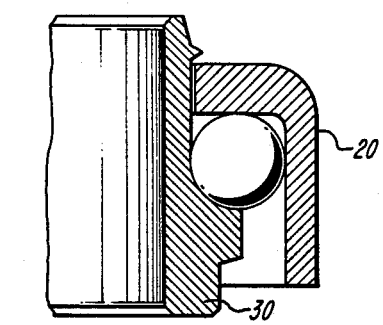
FIG. 8B
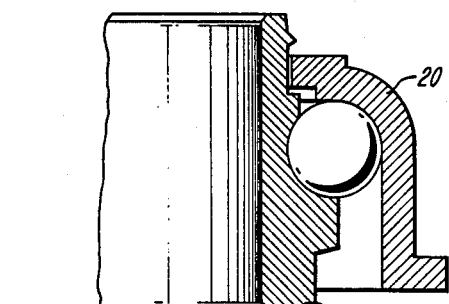
FIG. 8C

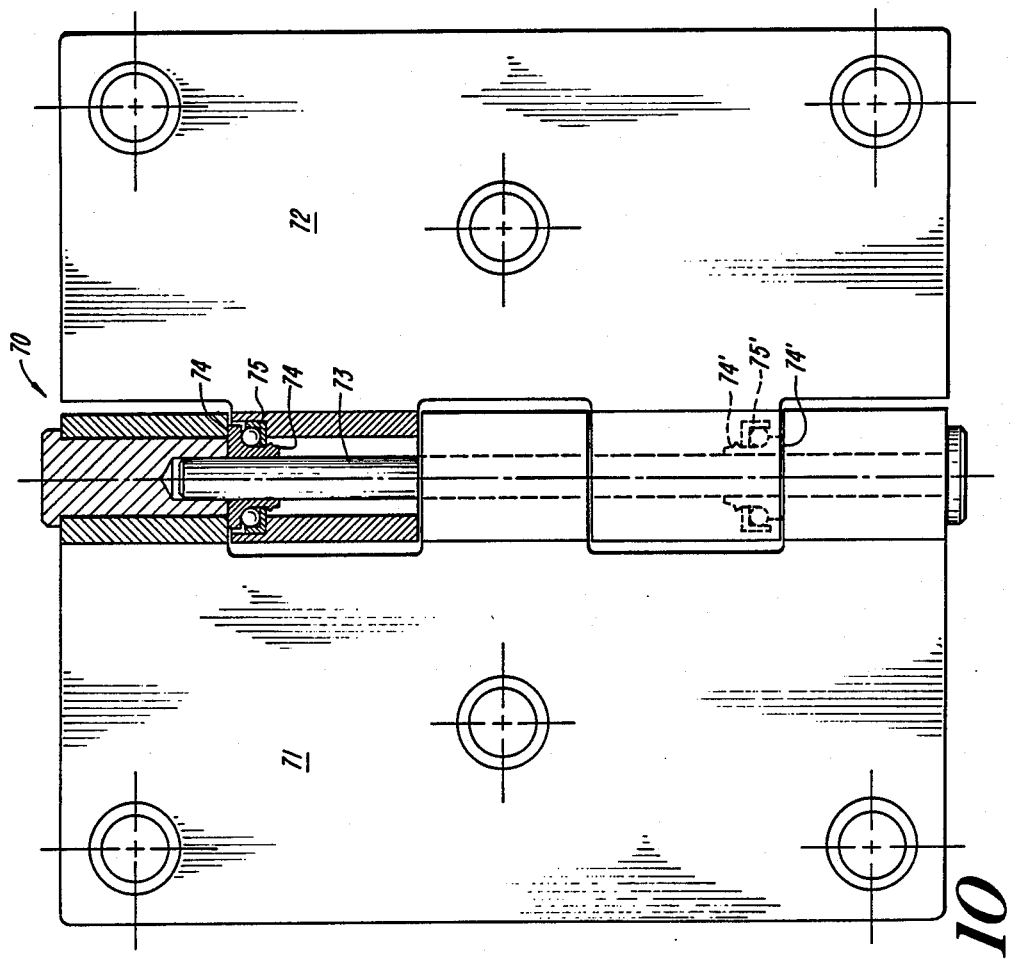
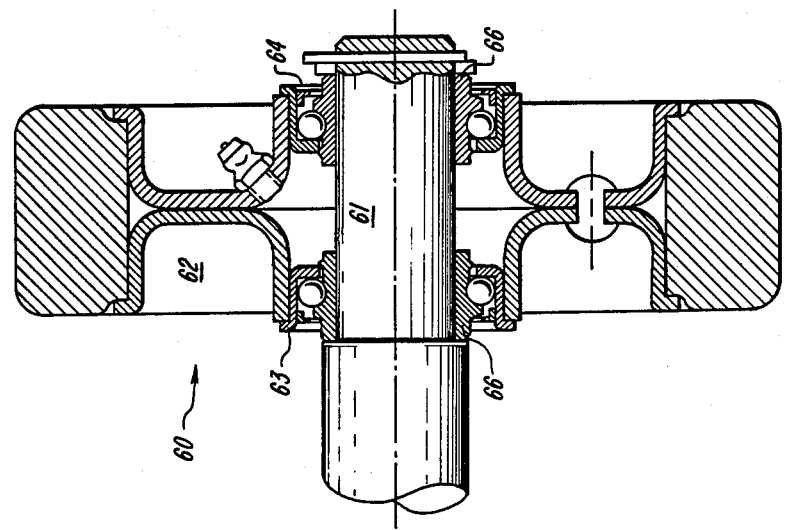
FIG. 9
FIG. 10

HARDENED BALL BEARING ASSEMBLY

BACKGROUND OF THE INVENTION

The present invention relates to bearing assemblies having an inner race and an outer race with a plurality of ball bearings between the races, and more particularly to such bearing assemblies which are intended for applications involving moderate loads and speeds, and requiring long bearing lifetime yet for which the manufacturing expense of precision grinding or other secondary operation is not justified. Such bearings are used, for example, in the roller assemblies of conveyors, in washing machines, and in the wheel assemblies of motorized lawn and garden equipment to support a cantilevered load, and in the hinges of large doors.

For such applications, it is desirable to fabricate an inexpensive bearing as a single assembly for shipment and installation into the end product, to assure that the ball bearings are not dispersed. However, because of the hardness required on ball races, the steel of such bearings is quite brittle and the ball races cannot be flexed so as to snap together without fracturing.

FIGS. 1A, 1B show sections through several hardened bearing assemblies of the prior art which provide a unitary bearing assembly for shipment and installation. As shown in FIG. 1A, a bearing assembly 1 includes a first race 2, a second race 3 and a plurality of bearings 4 between the races, with a jacket 5 holding the two races together. Jacket 5 serves to secure the bearing assembly together during shipment but is designed to fit within a housing so as to permit direct pressure-transmitting contact with the races from the components being supported.

FIG. 1B shows another prior art bearing 10 of relatively small dimension having a stamped inner race 12 and a stamped outer race 13 with a plurality of bearings 14 held therebetween. A tubular neck 15 of the inner race extends through the center of the outer portion, and is flared or punched out at one or more discrete points 15a after assembly of the bearing to retain the outer race 13 on the neck 15. In this prior art bearing the races are stamped from a relatively soft sheet stock, and, following assembly, the entire bearing assembly is heat treated to harden the bearing surfaces. Such hardening of a completed assembly is less effective than treatment of the races separately, which permits a more uniform and deeper exposure to the hardening environment. Nonetheless, post-assembly hardening is required in this embodiment because the punching operation for making the retaining flare or bulges 15a would shatter a prehardened race.

OBJECTS AND SUMMARY OF THE INVENTION

It is an object of the invention to provide an improved bearing which is manufactured by economical techniques and shipped as an integral assembly.

It is another object of the invention to provide a bearing having components which snap together to form an integral assembly, wherein the snap-together surfaces are formed without precision grinding.

It is another object of the invention to provide a snap-together bearing which has retaining faces such that the bearing races snap together and are retained assembled by mating retaining surfaces having an interference fit, wherein the mating surfaces have a shape such that the interference fit may be as large as the manufacturing tolerance for a stamped or machined components without cracking a bearing race during assembly, and wherein a bearing race is formed as a metal stamping.

These and other desirable features of the invention are obtained in a bearing assembly having an inner and an outer race and a plurality of rolling bearing elements between the inner and outer races, in which the inner and the outer races each have a respective opposing retaining face dimension for an interference fit one about the other so that the bearing races may be assembled into an integral bearing assembly by providing an assembly force to one of the races for driving the opposing faces past an interference fit position to a position in which each race rotates freely with respect to the other. In a preferred embodiment the retaining face of one race includes a radially protruding ridge, and the corresponding retaining face of the other race includes a plurality of radially protruding ears, the ridge and the ears each having a dimension for providing the interference fit.

BRIEF DESCRIPTION OF THE DRAWINGS

FIGS. 1A, 1B show sections through prior art hardened bearing assemblies;

FIGS. 2A, 2B show a side view of outer and inner races, respectively of one preferred embodiment of an angular contact bearing according to the present invention;

FIGS. 4A, 4B show sections through the outer and inner races of FIGS. 2A, 2B;

FIG. 7 shows a partial cutaway section of the races of FIGS. 2-6;

FIGS. 8A, 8B and 8C show sectional views of alternative forms of a bearing race according to the invention;

FIG. 9 shows a section through a wheel bearing assembly according to the invention; and FIG. 10 shows a hinge bearing assembly according to the invention.

DETAILED DESCRIPTION OF PREFERRED EMBODIMENTS

Figure 3A:
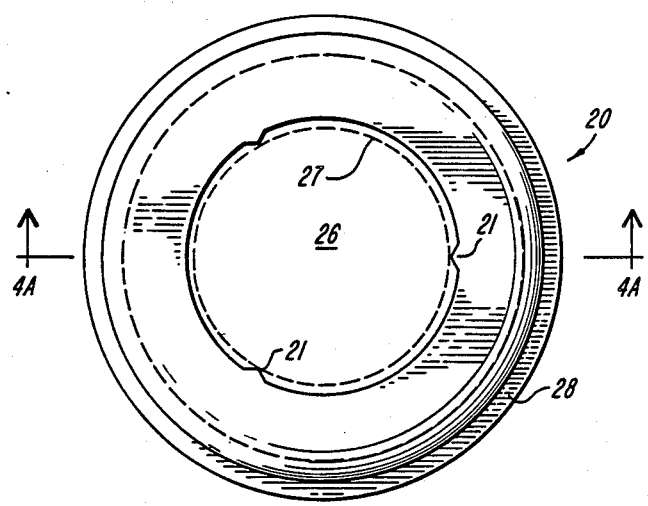
FIGS. 3A, 3B show top views of the races shown in FIGS. 2A, 2B respectively.

FIG. 2A shows an outer race 20 and FIG. 2B shows an inner race 30 of a snap together angular contact bearing according to a preferred embodiment of the present invention. As shown, inner race 30 has a lower portion 31 which serves as a thrust force receiving surface, and also has a bearing support surface 32 which provides an axial-radial bearing surface upon which ball bearings 33 (shown in phantom) are supported. A central cylindrical sleeve 34 rises from the portion 31 and has a ridge 35 formed at an upper end thereof and extending radially outward therefrom. Ridge 35 serves as an interference fit retaining surface for assembly of the upper race 20 to the lower race 30 and for retaining the race 20 thereon after assembly. A peripheral lip 28 of the outer race extends radially outward about the circumference of the race.

Preferably race 30 is formed by a machining operation, e.g., on an automatic screw machine, so that its features have radial symmetry and fairly precise dimensional tolerance. As shown more clearly in FIG. 6 below, the bearing diameter is defined by the maximal dimension of the races. The inner race is formed with an inner bore 36 which may for example receive an axle, shaft or hinge pin when mounted in its intended use. Ridge 35 extends radially outward from sleeve 34 to a peak which lies along a circle 37. The dimension of circle 37 thus defines the maximum diameter over which the outer race will be fitted during assembly.

Figure 3B:
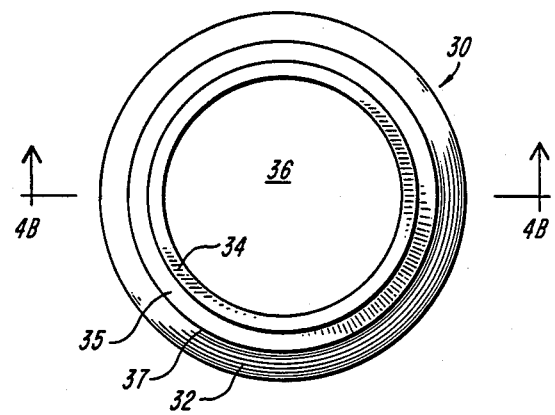

FIG. 3A shows a top view, corresponding to that of FIG. 3B, of the outer race 20 of FIG. 2A. As shown, outer race 20 has the form of a generally downwardly oriented dish or saucer with a central aperture 26 formed therein. Extending from the body 20 of the race into the central aperture are a plurality of ears 21, which protrude into the aperture 26 so as to define a circle of minimum diameter, indicated in phantom at 27, which is of a diameter smaller than that of a maximum extension 37 of the ridge of the inner race. The difference in diameters between circles 37 and 27 is the interference fit dimension, and represents the distance which the bearing structure must deflect or deform in order to assemble the outer race onto the inner race.

The outer race 20 of an examplary prototype wheel bearing here illustrated as a preferred embodiment is preferably formed as a metal stamping, for example from sheet material 0.094 inches thick of C-1018 cold rolled steel. This material may be hardened with a carbo-nitride treatment to a Rockwell C hardness in the range of 60 to 63 for a depth best suited to the intended application, so that for small bearings substantially the entire thickness of the bearing race may be hardened.

FIGS. 4A, 4B show sections through the outer and inner races of FIGS. 2A, 2B along the sections indicated in FIGS. 3A, 3B, respectively. The contours of ridge 35 and of the interference face of ears 21 are shown in greater detail. Each has a pointed or rounded contour, which facilitates their slipping past or through the opposing retaining face during assembly.

Figure 5:
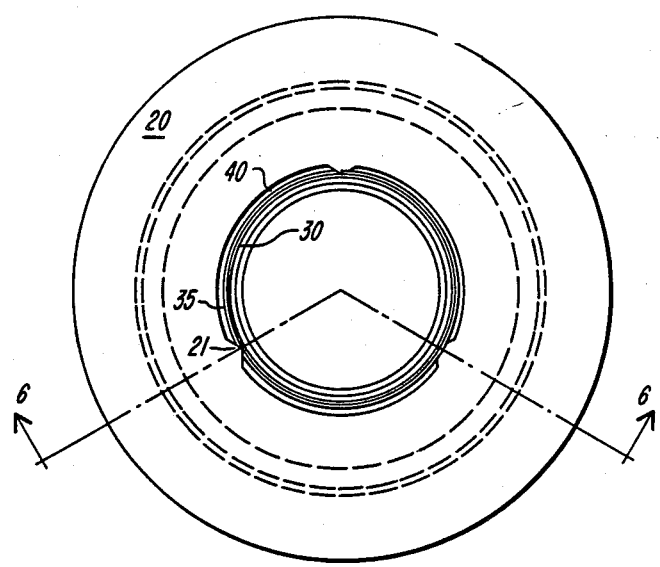
FIG. 5 shows a split top view of the races of FIGS. 2A, 2B before and after assembly.
Figure 6:
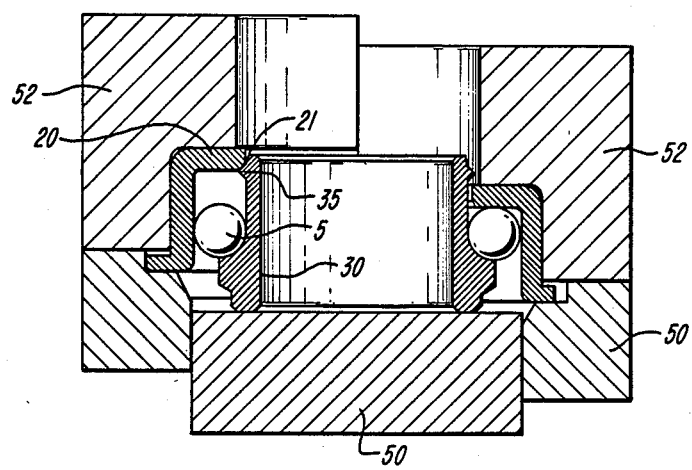
FIG. 6 shows a section in a vertical plane through the races in the positions illustrated in FIG. 5.

FIGS. 5 and 6 show a top view and a vertical section respectively of a bearing assembly according to the present invention, such as that of FIGS. 2-4. These two Figures are split, with the left hand side showing the bearing components in position for assembly, before the outer race has been fitted over the inner race, and the right hand side showing the components in the assembled position. As shown in the left side of FIG. 5, ears 21 of outer race 20 rest on top of ridge 35 of the inner race 30, and the major portion of the circumference of the inner aperture of the outer race 20 clears the ridge by a gap 40 which in the illustrated preferred wheel bearing embodiment is a gap in the range of approximately thirty thousandths of an inch.

FIG. 6 is a sectional view of the bearing of FIG. 5 during assembly in the positions shown in FIG. 5. For assembly of the outer race over the inner race, the inner race 30 is placed on a die 50 and the ball bearings 5 are placed in position thereon. The outer race 20 is then placed over the inner race 30 so as to rest on the ridge 35, below a punch 52 which is aligned with the bearing. Actuation of the punch 52 then drives the ears past the ridge, securing the outer race on the inner race with the bearings 5 held between the two races.

In the previously mentioned prototype of a preferred embodiment, a wheel bearing has an outer diameter in the range of 1⅜ inches and the outer race is formed by stamping and drawing from sheet stock. The edge dimensions of ears 21 thus have a dimensional variation characteristic of a stamping, and may vary by up to approximately two thousandths of an inch. The corresponding inner race is formed by machining, and may have a dimensional variation in the range of approximately two thousandths of an inch. The ridge 35 and ears 21 are dimensioned to achieve an interference fit of approximately (0.001) to (0.006) inches. It will be appreciated that with a conventional snap-fit bearing structure, a deflection of five thousandths of an inch on a bearing having a diameter in the neighborhood of one inch and a Rockwell C hardness of approximately 60 is an extreme deflection which would crack or break the bearing race in many instances. With the opposed retaining surfaces of the present invention, however, the points of the ears may undergo deformation without transmitting stresses to the bearing race, and further may be chipped by, or may gouge a path through, the ridge during assembly without impairing the ability of the ridge and ears to retain the bearing assembled during shipment and handling. Similarly, the orthogonally oriented peak of the ridge 35 may endure extreme pressures without transmitting a destructive force to the body of race 30.

This property will be understood with reference to FIG. 7, which shows a partial cutaway section taken vertically through the ridge and an ear of the races of FIGS. 2A, 2B. Ear 21 comes to a peak lying on vertical line V, and ridge 35 comes to a peak along a circle lying in horizontal plane H. The assembly of the bearing past its interference fit position thus amounts to moving the summit or knife-edge peak of ear 21 along line V perpendicularly to the horizontal thin peak or knife-edge of ridge 35. Thus the contact pressures of the interference assembly are effectively isolated from the main body of races 20, 30.

In this manner the invention provides a hardened bearing of snap-together construction.

FIGS. 8A, 8B, 8C are sections similar to those of FIG. 6, illustrating different bearing constructions according to the invention. The bearing illustrated in FIG. 8A is similar to that shown in FIG. 7 but has an outer race which is stamped to provide a sharp-cornered raceway which contacts the balls along an upper and a side surface. A seal 29 is also shown. FIG. 8B shows a bearing in which the outer race 20 has no protruding rim. FIG. 8C shows a bearing in which the outer (and inner) race has an arcuate-contoured raceway for a greater bearing surface.

FIG. 9 shows a wheel bearing assembly according to one embodiment of the invention, illustrated in a section aligned centrally along the axis of an axle 61. A wheel hub 62 has oppositely-oriented first and second bearings 63, 64 on opposed sides of the hub, with the outer race of each bearing tightly fitted into the central bore of the hub. The inner races fit over the axle 61, with a flat force-receiving face 66 facing inward on the inboard bearing 63, and outward on the outboard bearing 64. A thrust washer and circlip or cotter pin secures the wheel assembly 60 on the axle. As shown, each bearing 63, 64 is identical to the bearing illustrated in FIG. 8A.

FIG. 10 shows a hinge bearing assembly 70 according to another embodiment of the invention, in which hinge plates 71, 72 rotate about an upper bearing and a lower bearing (shown in phantom) having respective inner races 74, 74′ and outer races 75, 75′. The inner races are tightly fitted to hinge pin 73 and rest in weight-bearing contact with the knuckles of hinge plate 71. Plate 71 also tightly holds hinge pin 73 at its ends. The outer races 75, 75' fixedly rest in corresponding upper and lower counterbores in the knuckles of hinge plate 72. Each of the upper and lower bearing assemblies is formed with a snap-together structure according to the invention. The outer diameter of races 75, 75' is approximately nine-sixteenths of an inch. Despite this small size, a bearing of this embodiment may be manufactured without secondary machinary or grinding operations, and hardened to a hardness in the range of 60–63 or greater on a Rockwell C scale, prior to assembly, as previously described.

In each of the foregoing applications, the construction of the illustrated bearings is such that not only is the individual bearing assembly retained together as a unitary assembly, but the bearing assembly also may be pressed into its intended structure—a wheel hub or a hinge knuckle—without applying pressure in a direction which might push the bearing constituents apart. Thus, pressure against the peripheral lip 28 of the bearing outer race drives the bearings 63, 64 into wheel 60, and pressure against the inner races 74, 74' drives the upper and lower hinge bearings into the recessed counterbores of the knuckles of hinge plate 72. Further, the entire wheel-axle assembly or hinge assembly is also simply assembled without risk of bearing separation. Thus, axial pressure inward on face 66 of the outboard wheel bearing presses the entire wheel assembly onto axle 61 without impairing the snap-assembly of the two wheel bearinqs, and hinge pin 73 may be pressed into the hinge 70 without disturbing the bearing assemblies of the hinge.

It will be appreciated that the invention has been described with reference to a particular embodiment, and may be embodied in other forms without departing from the spirit thereof. In particular, the number of ear-like retaining faces may be varied, the shapes of opposing retaining faces may be varied, and the inner and outer races may be fabricated by other processes. The outer race need not be stamped as shown but may be machined and broached to arrive at a inner shape having ear-like projections. Furthermore, in different manufacturing operations, relative positions of the ridge and ears may be interchanged, so that, for example, an radially inward directed ridge engages radially outwardly directed ears. Further, while the invention is illustrated as having particular utility in solving a problem in the field of hardened small angular contact bearings, the invention may be applied to bearings of other types and sizes, and is limited only by the following claims.

What is claimed is:

1. A hardened bearing assembly having an inner and an outer race and a plurality of rolling bearing elements between the inner and the outer race, wherein said inner and said outer race each have respective opposing retaining faces integral with the said respective races and dimensioned for an interference fit one about the other so that the bearing races may be assembled into a unitary bearing assembly by providing an assembly force to a said race for driving the opposing faces past an interference fit position to a position wherein each race rotates freely with respect to the other, wherein the retaining face of one said race includes a radially-protruding ridge, and the retaining face of the other said race includes a plurality of radially-protruding ears, said ridge and said ears each having a dimension for providing said interference fit; and wherein the interference fit is in the range of approximately 0.001 to 0.006 inches, and wherein the bearing has a diameter of under approximately 2 inches.

2. A bearing assembly according to claim 1, wherein said interference fit has a magnitude within a normal range of dimensional tolerance for a stamped metal race, and wherein at least one said race is a metal stamping manufactured without cutting or grinding of its said retaining face to obtain the said interference fit.

3. A bearing assembly according claim 1, wherein said ears of a said race have a substantially pointed triangular section with apex points directed away from the said race toward the ridge of the opposing race.

4. A bearing assembly according to claim 1, having a hardness greater than approximately 60 on a Rockwell C scale.

5. A bearing assembly according to claim 1, wherein the bearing has a Rockwell C hardness of at least approximately 60, and wherein the bearing has a total outer diameter of between approximately one-half inch and one and one-half inches.

6. A hardened bearing assembly having a hardened first race, a hardened second race and a plurality of rolling bearing elements between the first and second races, wherein said first and said second race each have respective opposing reataining faces integral therewith and dimensioned for an interference fit one about the other so that the bearing races may be assembled into a unitary bearing assembly by providing an assembly force to a said race for driving the opposing faces past an interference fit position to a position wherein each race rotates freely with respect to the other, wherein said interference fit has a magnitude varying with a normal range of dimensional tolerance for a stamped metal race, and wherein a said race is manufactured without secondary machining or grinding of its said retaining face to obtain the said interference fit; and wherein said bearing assembly has a hardness of approximately of at least 55 on a Rockwell C scale; and wherein the interference fit is in the range of approximately 0.001 to 0.006 inches, and wherein the bearing has a diameter of under approximately two inches.

7. A bearing assembly according to claim 6, wherein the retaining face of said first race includes a radially-protruding ridge, and the retaining face of said second race includes a plurality of radially-protruding ears, said ridge and said ears each having a dimension for providing said interference fit and wherein said ears of a said race have a substantially triangular section with apex directed away from said second race toward said first race.

8. First and second bearing assemblies according to claim 6, wherein each said bearing assembly has inner and outer races of the axial-radial thrust type, and further comprising a machine structure having a longitudinal bore therethrough, said first and second bearing assemblies being fitted within said longitudinal bore in opposing axial orientations.

9. First and second hardened bearing assemblies, each said hardened bearing assembly, having a hardened first race, a hardened second race and a plurality of rolling bearing elements between the first and second races, wherein said first and said second race each have respective opposing retaining faces integral therewith and dimensioned for an interference fit one about the other so that the bearing races may be assembled into a unitary bearing assembly by providing an assembly force to a said race for driving the opposing faces past an interference fit position to a position wherein each race rotates freely with respect to the other, wherein said interference fit has a magnitude varying with a normal range of dimensional tolerance for a stamped metal race, and wherein a said race is manufactured without secondary machining and grinding of its said retaining face to obtain the said interference fit; and wherein each said bearing assembly has inner and outer races of the axial-radial thrust type, and further comprising a machine structure having a longitudinal bore therethrough, said first and second bearing assemblies being fitted within said longitudinal bore in opposing axial orientations; and wherein the machine structure is a hinge plate of a hinge, and wherein said bearings are fitted in opposing axial orientations in respective knuckles of the hinge plate.

10. First and second hardened bearing assemblies, each said hardened bearing assembly having a hardened first race, a hardened second race and a plurality of rolling bearing elements between the first and second races, wherein said first and said second race each have respective opposing retaining faces integral therewith and dimensioned for an interference fit one about the other so that the bearing races may be assembled into a unitary bearing assembly by providing an assembly force to a said race for driving the opposing faces past an interference fit position to a position wherein each race rotates freely with respect to the other, wherein said interference fit has a magnitude varying with a normal range of dimensional tolerance for a stamped metal race, and where a said race is manufactured without secondary machining or grinding of its said retaining face to obtain the said interference fit; and wherein each said bearing assembly has inner and outer races of the axial-radial thrust type, and further comprising a machine structure having a longitudinal bore therethrough, said first and second bearing assemblies being fitted within said longitudinal bore in opposing axial orientations; and wherein the machine structure is a wheel hub, and wherein said bearings are fitted in opposing, axial orientations in opposing ends of an axle-receiving bore of the wheel hub.

* * * * *